Figure 1:
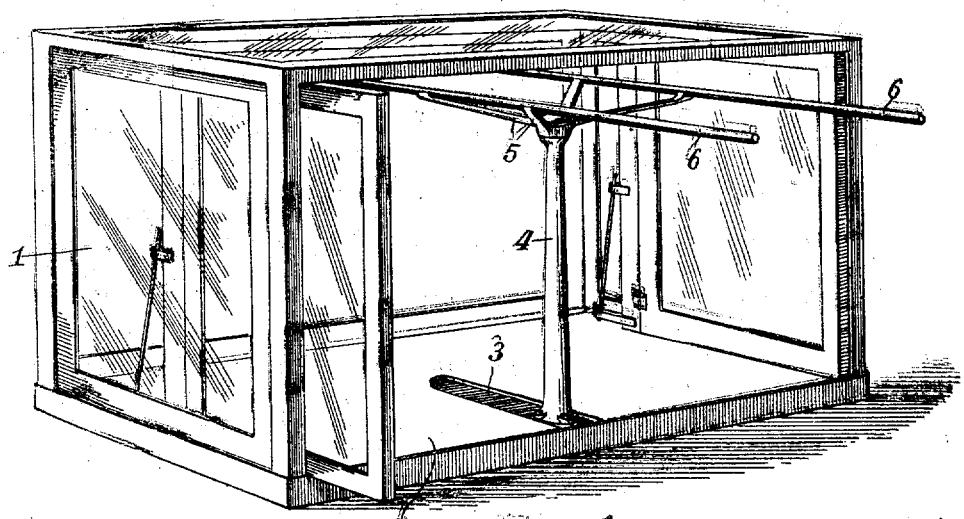

L. G. DODGE. W. F. FREEMAN & A. VANDERVELD.

MOVABLE GARMENT SUPPORT.

APPLICATION FILED JULY 11, 1910.

Reissued Dec. 23, 1913.

13,660.

3 SHEETS—SHEET 1.

Witnesses

H. O. Van Cleef

Palmer A. Lewis

Inventors

Leon G. Dodge

William F. Freeman

Anthony Vanderveld

By Luther V. Moulton

Attorney

L. G. DODGE. W. F. FREEMAN & A. VANDERVELD.

MOVABLE GARMENT SUPPORT.

APPLICATION FILED JULY 11, 1910.

Reissued Dec. 23, 1913.

13,660.

3 SHEETS—SHEET 2.

Witnesses

N. O. Van Antwerp

Palmer A. Jones.

Inventors

Leon G. Dodge

William F. Freeman

Anthony Vanderveld

By Luther V. Moulton

Attorney

L. G. DODGE. W. F. FREEMAN & A. VANDERVELD.

MOVABLE GARMENT SUPPORT.

APPLICATION FILED JULY 11, 1910.

Reissued Dec. 23, 1913.

13,660.

3 SHEETS—SHEET 3.

Witnesses

H. O. Van Antwerp

Palmer A. Jones

Inventors

Leon G. Dodge

William F. Freeman

Anthony Vanderveld

By Luther V. Moulton

Attorney

UNITED STATES PATENT OFFICE.

LEON G. DODGE, OF ST. LOUIS, MISSOURI, AND WILLIAM F. FREEMAN AND ANTHONY VANDERVELD, OF GRAND RAPIDS, MICHIGAN, ASSIGNORS TO GRAND RAPIDS SHOW CASE COMPANY, OF GRAND RAPIDS, MICHIGAN, A CORPORATION OF MICHIGAN.

MOVABLE GARMENT-SUPPORT.

13,660. Specification of Reissued Letters Patent. Reissued Dec. 23, 1913.

Original No. 941,502, dated November 30, 1909, Serial No. 505,815. Application for reissue filed July 11, 1910. Serial No. 571,524.

*To all whom it may concern:*

Be it known that we, LEON G. DODGE, WILLIAM F. FREEMAN, and ANTHONY VANDERVELD, citizens of the United States of America, said LEON G. DODGE formerly a resident of Grand Rapids, county of Kent, and State of Michigan, and now residing at St. Louis, in the State of Missouri, the said WILLIAM F. FREEMAN and ANTHONY VANDERVELD, residing at Grand Rapids, county of Kent, and State of Michigan, have invented certain new and useful Improvements in Movable Garment-Supports; and we do hereby declare the following to be a full, clear, and exact description of the invention, such as will enable others skilled in the art to which it appertains to make and use the same.

Our invention relates to improvements in movable garment supports for display devices, such as show cases, wardrobes and the like.

In various display devices a glass case is used and a rotative member supported therein, which member must be moved out toward the front of the case before it can be rotated without striking the case, and must be turned to proper position before it can be moved back into the case. It is also desirable that the said member shall be freely rotative when moved forward.

The general object of the present invention is to provide a display device, which shall be movable into and out of a compartment, such for instance as a glass case, and wherein such display device shall be prevented from rotative movement while being moved into or out of such compartment to prevent any part of the device from striking the case or compartment, and wherein also, when the display device is moved to its outer position, such display device shall be free to be rotated to the end that the salesman may turn it to show the goods at every part of the device; to provide means whereby the movable support for said rotative member may be locked in outward and inward positions. These and other objects of the invention will be best understood from the following description and accompanying drawings which disclose one form of means for carrying the invention into practical effect, it being understood that it is not restricted to the particular means or details herein, but in its true scope is defined by the claims.

Figure 2:
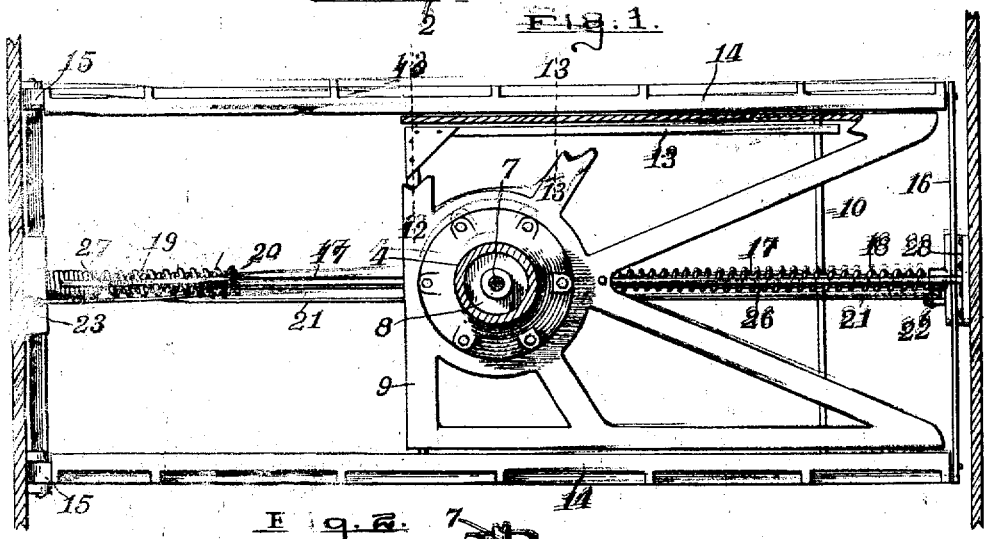
Figure 3:
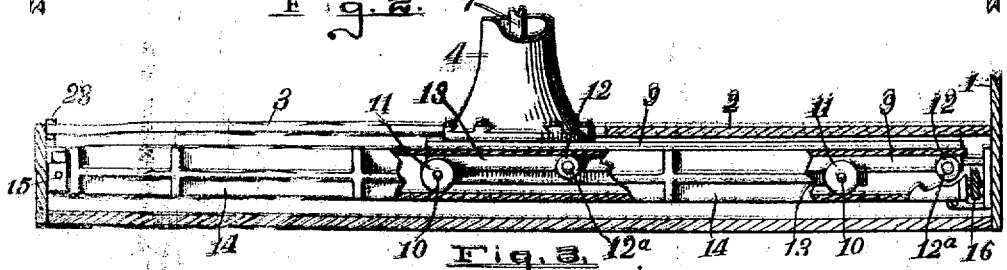
Figure 4:
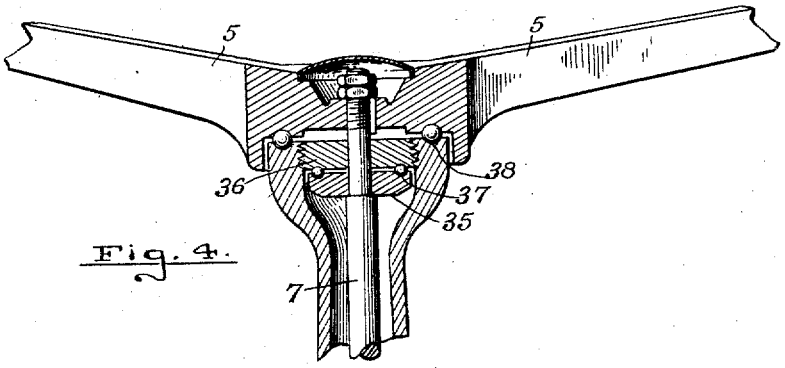
Figure 5:
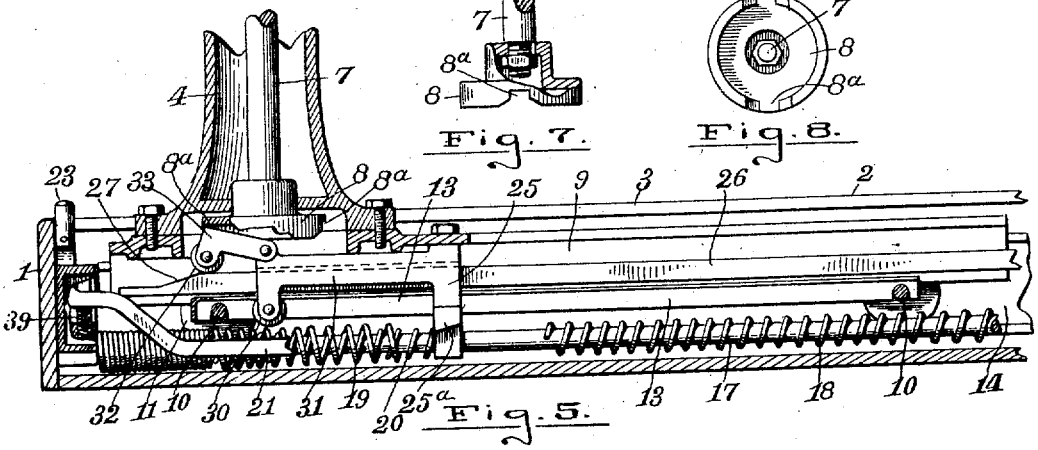
Figure 7:
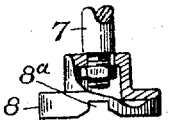
Figure 8:
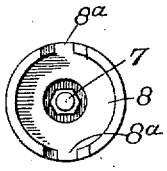
Figure 6:
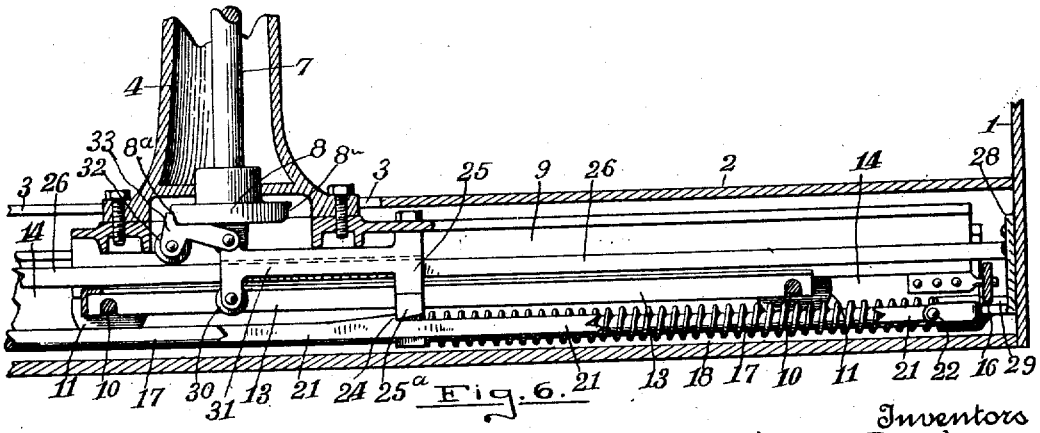
Figure 10:
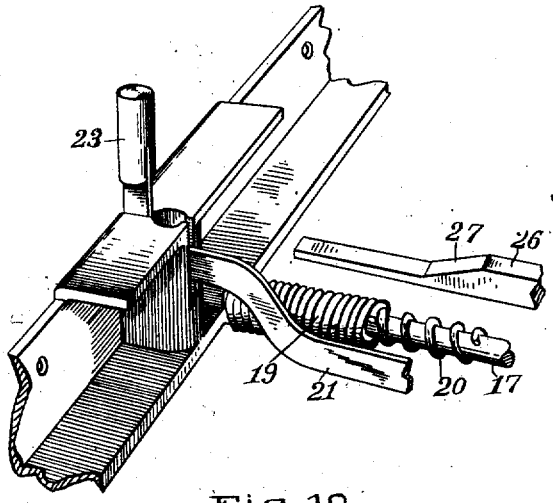
Figure 11:
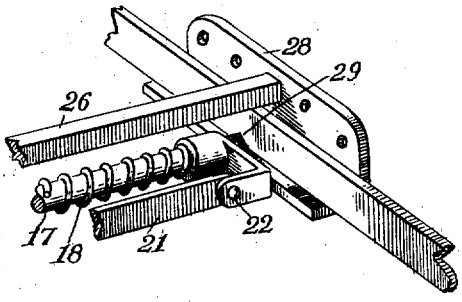
Figure 12:
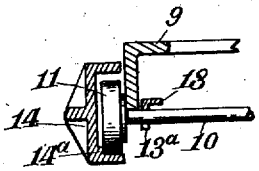
Figure 9:
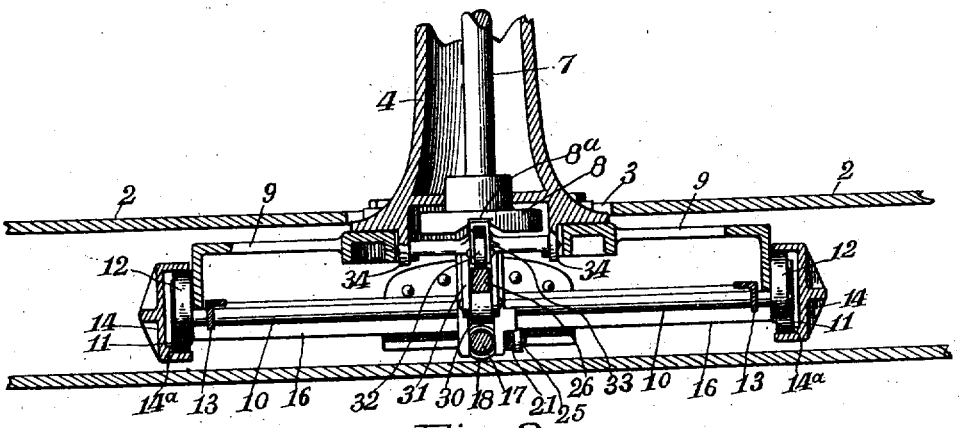

Referring to the accompanying drawings:—Figure 1 is a perspective of a device embodying our invention; Fig. 2 a plan view of the carriage mechanism; Fig. 3 a side elevation of the same with parts broken away; Fig. 4 an enlarged detail in vertical section of the upper part of the column and the central portion of the spider; Fig. 5 a sectional detail of the forward end of the carriage mechanism with the carriage in forward position; Fig. 6 the same of the rear end of the same with the carriage in rear position; Figs. 7 and 8 details of the locking head on the lower end of the shaft 7; Fig. 9 a transverse sectional detail of the carriage mechanism; Fig. 10 a perspective detail of a portion of the mechanism at the front of the case; Fig. 11 the same at the rear of the case; Fig. 12 a detail in vertical section on the line 12—12 of Fig. 2; and Fig. 13 the same on the line 13—13 of Fig. 2.

Like numbers refer to like parts in all of the figures.

1 represents the case, of any convenient dimensions and character, having a bottom 2 spaced apart from the floor, and provided with a slot 3 extending from near the center of the case to the front thereof, in which slot is movably supported a hollow column 4, and on the top of which column is mounted a rotative spider 5 having radiating arms supporting bars 6 arranged parallel to each other and spaced apart, on which bars the clothing is hung by any convenient means, not shown.

7 is a shaft in the axis of the column 4 rigidly attached to the spider 5 at its upper end and having a rigidly attached cup-shaped head 8 attached at its lower end, provided with recesses $8^a$ at opposite sides, engaged by a latch 33 to lock the spider with the rods 6 extending parallel with the length of the case, and thus prevent contact of the rods with the case and accidental damage to the same. To freely rotate the spider on the column, the top of the column is enlarged and provided with a ball bearing 38 supporting the spider which is held down thereon by a collar 35 on the shaft 7 below a bushing 36 in the top of the column, and a ball bearing is interposed between the collar and bushing to prevent friction.

The above constitutes a convenient form of locking and unlocking device for the rotary spider or member, as will more fully appear, but obviously many other forms might be employed within the true character of the invention in this respect.

From the construction described as one of the many forms of means that may embody the invention, it will be noted that, when the rotative member for supporting the goods is in a rearward position within the case or compartment, it is locked in such position, and is also locked from rotative movement, when in such position; that as the rotative member is bodily moved in the case to carry it to front or rear position, it is effectively locked from rotative movement and when the rotative member is in outward position to display the goods it is unlocked and may be rotated. In the present form of the invention the support or carrying part for the rotative member slides back and forth in the case, but obviously it may be herwise moved within the true scope of the invention.

Figure 13:
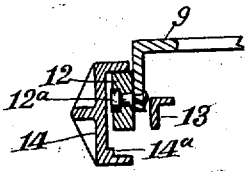

The column 4 is mounted on a carriage 9 which carriage is supported upon rotative axles 10 having a rolling contact with the underside of the sides of the carriage to avoid friction in moving the latter. Fixed on the respective ends of the axles 10 and outside the carriage are wheels 11, which wheels traverse the inwardly projecting lower flanges of channel bar tracks 14. Rollers 12 are also fixed on the outer sides of the carriage, which engage the underside of the upper flanges of the tracks 14, and hold the carriage from tilting upon the axles. By means of this rolling arrangement of the axles beneath the carriage and the wheels rolling on the lower flange of the tracks, a practically frictionless movement of the carriage is accomplished. To prevent lateral movement of the carriage, the wheels 11 run adjacent to guide ribs 14[a] in the tracks 14 as shown in Figs. 9, 12 and 13.

To maintain the axles 10 in parallel relation and properly spaced apart, a frame 13 of angle iron is provided within the carriage and having recesses or notches to engage the axles and hold the same in proper relation and permit free rotation thereof. To maintain these tracks in proper relation, they are each supported by the case at the front end as at 15, and at the rear ends are mounted on the respective ends of a rocker bar 16 pivotally supported at the middle on a knife edge 29 projecting from a plate 28 attached to the rear of the case. The tracks are thus on a three point support and maintained in proper relation regardless of any distortion of the case in which they may be supported.

17 is a rod extending from front to rear of the case and fixed midway between and parallel to the tracks 14. On this rod at the rear of the carriage is mounted a compressible coiled spring 17, which when the carriage is released, propels the same toward the front of the case. To hold the carriage in rearward position, a downwardly projecting arm 25 is provided projecting from a slide 31 attached to the carriage, against which arm the spring 18 operates to propel the carriage forward, and which arm is provided with a shoulder 25[a] engaged by a corresponding shoulder 24 on a latch bar 21 pivoted at the rear end as at 22, and vertically movable at the front end, being there supported upon a spring 39 and provided with a push rod 23, whereby the spring normally maintains engagement of the described shoulders as shown in Fig. 6, and when the latch bar is depressed by the push rod 23, the shoulders are disengaged and the carriage released.

On the front end of the rod 17 is a buffer spring 19 to engage the arm 25 and receive the impact of the carriage when it reaches the front of the case. Within this buffer spring 19, is a weaker spring 20, which serves to move the carriage back a short distance for locking the rotative spider, and supporting rods, as illustrated in Fig. 5 and is manually compressed for releasing the same. For this locking purpose, a bar 26 is secured to the rear plate 28 at one end, and extends through the slide 31 to near the front of the case and parallel with the tracks and movement of the carriage. This bar is carried upon a roller 30 and supports the latch 33 in engagement with one of the recesses 8[a] by means of a roller 32 journaled in the latch and traversing the upper side of the bar. At the front end this bar is reduced at its upper side and provided with an incline 27, and when it is desired to rotate the spider for the purpose of reversing the position of the rods 6, the carriage is manually brought forward to the limit, the inner spring 20 compressed sufficiently to permit the rod 32 to run down the incline 27, and the latch drops out of engagement with the recess 8[a], the spider and arms, together with the shaft, can then be rotated one half of a revolution, the carriage being released, the spring 20 will move the carriage back sufficient to traverse the roller 32 up the incline 27 and reëngage the latch with the recess. Should the said rotation be more or less than one half, the head will hold the latch down and lock the carriage in forward position, so that the carriage cannot run back, except when the rods are in a proper and safe position.

What we claim is:—

1. A display device, comprising a case or compartment, a rotatable member carrying means for supporting goods, a support for said rotatable member movable toward the front of the case and back again to rearward position, means for automatically locking said rotatable member during the movement of the support and releasing the same when in its forward position, and a spring to move the support rearward and relock the said member.

2. A display device, comprising a case or compartment, a rotatable member carrying means for supporting goods, a support for said rotatable member movable toward the front of the case and back again to rearward position, a head on said member provided with a recess, a latch on said support to engage the recess, a bar traversed by the latch and having an incline near the front end to release the latch from the recess and to reëngage the latch with the same, and a spring to move the support rearward to automatically reëngage the latch.

3. A display device, comprising a case or compartment, a rotatable member carrying means for supporting goods, a support for said member movable toward the front of the case and back again to rearward position, means for locking said support operative when the support is in forward position by rotating the said member and operated to lock the said rotatable member by rearward movement of the said support.

4. A display device, comprising a case or compartment, a rotatable member carrying means for supporting goods, a support for said member movable toward the front of the case and back again to rearward position, a head fixed on said rotatable member and having a recess, a latch to engage the recess, and means for engaging and disengaging the latch operated by movement of the support.

5. A display device, comprising a case or compartment, a rotatable member carrying means for supporting goods, a support for said member movable toward the front of the case and back again to rearward position, a head fixed on said rotatable member and having a recess, a latch to engage the recess, and a bar traversed by the latch and adapted to engage the latch with the recess whenever the support is moved back from the forward position.

6. A display device, comprising a movable support, a rotatable member mounted on the said support and adapted to carry goods, a head fixed on said member and provided with a recess, a latch on the support, a bar traversed by the latch and holding the same within the recess, and also having a reduced portion to receive the latch to release the rotatable member and lock the support.

7. A display device, comprising a case or compartment, a rotatable member carrying a device for supporting goods, a support for said member movable toward the front of the case or compartment, a head on said rotatable member provided with a downwardly projecting flange, a latch on the carriage, a bar traversed by the latch and having a reduced portion and an incline adjacent thereto, the flange traversing the latch and holding the same down opposite the said reduced portion to lock the support when the rotatable member is turned, and the bar raising the latch into the recess and locking said rotatable member when the support is moved.

8. A display device, comprising a movable column, a rotatable garment support carried by the column, a recessed head rigidly connected to said support and rotatable therewith, a latch to engage the recess of the head, and means to engage and disengage the latch operated by movement of the column.

9. A display device, comprising a hollow column, a garment supporting member rotatably mounted on the column, a shaft fixed in the said member and rotatable in the column, a recessed head fixed on the shaft, and a latch to engage the recess in the head and hold the same from turning.

10. A display device, comprising a rotatable garment supporting member, a column supporting said member, a carriage on which the column is mounted, a shaft attached to said member and rotatable in the column, a head fixed on the shaft and having recesses, and a latch mounted on the carriage and engaging the recesses to hold the said member from turning.

11. A display device, comprising a column, a spider rotatable on the column, parallel bars spaced apart and supported by the spider, a shaft fixed in the spider and rotatable in the column, a head having recesses at opposite sides and fixed on the shaft, and a latch to alternately engage the recesses, whereby the bars may be reversed and held in each position.

12. A display device, comprising a column, a spider rotatable on the column, parallel bars supported by the spider and spaced apart, a ball bearing between the column and the spider, a shaft fixed in the spider and rotatable in the axis of the column, a bushing in the column, a collar on the shaft and below the bushing, a ball bearing between the collar and bushing, and releasable means for holding the spider at intervals from turning on the column.

13. A display device, comprising a carriage, a column mounted on the carriage, a rotatable garment support mounted on the column, a head connected to the support and rotatable therewith and also having recesses, a latch pivoted on the carriage and adapted to engage the recesses and hold the garment support from turning, and a bar traversed by the latch and holding the latch in engagement with a recess in the head, said bar also having a reduced portion to release the latch from the recess.

14. A display device, comprising a carriage, a rotatable garment supporting member mounted on the carriage, a head rigidly attached to the said member and having recesses, a slide on the carriage, a bar extending beneath the carriage and traversed by the slide, a latch pivoted on the slide and engaging the recesses in the head, a roller in the latch traversing the bar, said bar having a reduced upper portion, and an incline engaged by the roller to release and reëngage the latch.

15. A display device, comprising a carriage, a hollow column mounted on the carriage, a rotatable garment supporting member mounted on the column, a shaft fixed in said member and rotatable in the column, a head fixed on the shaft and having a downwardly projecting flange provided with recesses, a latch pivoted on the carriage and engaging the flange and recesses, a bar supporting the latch and traversed thereby when engaged with the recesses, said bar also having a reduced portion, and an incline whereby the latch is released from the recesses and the carriage held from moving when the latch engages the flange.

16. A display device, comprising a carriage, a rotatable garment supporting member mounted on the carriage, a head rigidly connected to the said member and rotatable therewith and also having recesses to receive a latch, a slide on the carriage, a bar beneath the carriage and traversed by the slide, said bar having a reduced upper portion and an incline at one end, a roller journaled in the slide traversing the under side of the bar and supporting the same, a latch pivoted on the slide and engaging the head and recesses therein, and a roller supporting the latch and traversing the upper side of the bar and the incline thereof.

17. A display device, comprising a carriage, a garment support mounted thereon, rotatable axles supporting the carriage and having rolling contact therewith, wheels fixed on the axles, tracks traversed by the wheels, and rollers journaled on the carriage and engaging the tracks to hold the carriage from tilting.

18. A display device, comprising a carriage, a garment supporting member mounted thereon, rotatable axles supporting the carriage and having rolling contact therewith, wheels fixed on the respective ends of the axles, channel bar tracks embracing the wheels and supporting the same upon their lower flanges, and rollers journaled on the carriage and engaging the under side of the upper flanges of the tracks.

19. A display device, comprising a carriage, a garment supporting device mounted on the carriage, rotatable axles having rolling contact with the carriage and supporting the same, a frame having recesses in which the axles are rotative and spaced apart in parallel lines, wheels fixed on the respective ends of the axles, tracks traversed by the wheels, and means for holding the carriage down upon the axles.

20. A display device, comprising a carriage, a garment supporting device mounted on the carriage, parallel tracks at the respective sides of the carriage and mounted on three points of support, wheels traversing the tracks, and a case inclosing the tracks, the carriage, and the said garment supporting device.

21. A display device, comprising a carriage, a garment supporting device mounted on the carriage, wheels supporting the carriage, tracks traversed by the wheels, a rod extending beneath the carriage and parallel with the tracks, an arm on the carriage traversing the rod, a spring on the rod engaging the arm to propel the carriage, and a buffer spring on the rod to engage the arm and stop the carriage.

22. A display device, comprising a carriage, a garment supporting device mounted on the carriage, tracks traversed by the carriage, a rod parallel with the tracks, an arm on the carriage traversing the rod, a spring on the rod and engaging the arm to propel the carriage, and a latch bar to engage the arm and hold the carriage with the spring under tension.

23. A display device, comprising a carriage, a garment supporting device rotatably mounted on the carriage, tracks supporting the carriage, a rod beneath the carriage and parallel with the tracks, an arm on the carriage traversing the rod, a spring on the rod engaging the arm to propel the carriage, a latch bar to engage the arm and hold the carriage against the spring, a latch to hold the garment supporting device from turning, a bar to support the latch and having a reduced end and an incline to release and reëngage the latch, and a buffer spring on the rod to engage the arm and move the carriage to automatically reëngage the latch.

24. A display device, comprising a carriage, a rotatable garment supporting device mounted on the carriage and having a head fixedly attached thereto and provided with a recessed flange, a latch mounted on the carriage to engage the flange and recesses, a bar and a rod extending parallel with the movement of the carriage, the bar having a reduced upper side and an incline at one end, a roller on the latch traversing the upper side of the bar to operate the latch, a spring on the rod to propel the carriage, a buffer spring on the rod oppositely acting to the propelling spring, and a latch bar to hold the carriage with the propelling spring compressed.

In testimony whereof, we hereunto affix our signatures in the presence of two witnesses.

LEON G. DODGE.
WILLIAM F. FREEMAN.
ANTHONY VANDERVELD.

Witnesses for Dodge:
ALBERT E. HAUSMAN,
THOS. H. COBB.
Witnesses for Freeman and Vanderveld:
PALMER A. JONES,
LUTHER V. MOULTON.

Copies of this patent may be obtained for five cents each, by addressing the "Commissioner of Patents, Washington, D. C."